US006172122B1

(12) United States Patent
Lawate et al.

(10) Patent No.: US 6,172,122 B1
(45) Date of Patent: Jan. 9, 2001

(54) STABLE EMULSIONS FROM GELLED OVERBASED SUBSTRATES WITH SURFACTANTS AND AQUEOUS LIQUIDS

(75) Inventors: Saurabh S. Lawate, Concord; William R. Sweet, Richmand Hts., both of OH (US)

(73) Assignee: The Lubrizol Corporation, Wickliffe, OH (US)

( * ) Notice: Under 35 U.S.C. 154(b), the term of this patent shall be extended for 0 days.

(21) Appl. No.: 09/213,855

(22) Filed: Dec. 17, 1998

(51) Int. Cl.$^7$ .............................. B01F 3/08; B01D 21/01; B01J 13/00; C08J 3/02; C09K 3/00
(52) U.S. Cl. .............................. 516/109; 516/20; 516/99; 514/938; 514/943; 514/944
(58) Field of Search ................................ 516/109, 20, 99; 514/938, 939, 940, 941, 942, 943, 944

(56) References Cited

U.S. PATENT DOCUMENTS

| 3,242,079 | * | 3/1966 | McMillen et al. | 252/33 |
|---|---|---|---|---|
| 3,372,115 | * | 3/1968 | McMillen et al. | 252/33 |
| 3,492,231 | * | 1/1970 | McMillen | 252/33 |
| 3,766,067 | * | 10/1973 | McMillen | 252/33 |
| 3,816,310 | * | 6/1974 | Hunt | 252/32.7 |
| 3,892,881 | | 7/1975 | Lissant | 426/602 |
| 4,057,504 | * | 11/1977 | Shiga et al. | 252/33 |
| 4,229,309 | | 10/1980 | Cheng et al. | 252/25 |
| 4,310,516 | | 1/1982 | Chang et al. | 424/145 |
| 4,627,192 | * | 12/1986 | Fick | 47/58 |
| 4,743,402 | * | 5/1988 | Fick | 260/412.1 |
| 5,102,680 | | 4/1992 | Glass et al. | 426/572 |
| 5,127,953 | | 7/1992 | Hamaguchi | 106/504 |
| 5,132,123 | | 7/1992 | Laiho et al. | 426/74 |
| 5,158,796 | | 10/1992 | Bernhardt et al. | 426/549 |
| 5,194,270 | | 3/1993 | Cante et al. | 426/74 |
| 5,300,242 | * | 4/1994 | Nichols et al. | 252/38 |
| 5,314,921 | | 5/1994 | Yesair | 514/784 |
| 5,401,424 | | 3/1995 | Vinci et al. | 252/18 |
| 5,501,807 | * | 3/1996 | Benda | 252/18 |
| 5,652,011 | | 7/1997 | Heertje et al. | 426/601 |
| 5,661,189 | | 8/1997 | Grieveson et al. | 514/784 |
| 5,919,741 | * | 7/1999 | Jaynes et al. | 508/460 |

* cited by examiner

*Primary Examiner*—Jill Warden
*Assistant Examiner*—Monique T. Cole
(74) *Attorney, Agent, or Firm*—Joseph P. Fischer; David M. Shold

(57) ABSTRACT

A stable emulsion composition is disclosed which comprises:

(A) a metal overbased gelled composition, prepared by forming a mixture of (i) a carbonated overbased material in an oleophilic medium, which material contains a metal salt of at least one organic acid material containing at least 8 carbon atoms, and (ii) an alcohol or an alcohol-water mixture;

(B) a surfactant; and (C) an aqueous liquid.

The stable emulsion composition may further comprise at least one of a solute, a suspended solid or an oxidation inhibitor.

52 Claims, No Drawings

STABLE EMULSIONS FROM GELLED OVERBASED SUBSTRATES WITH SURFACTANTS AND AQUEOUS LIQUIDS

FIELD OF THE INVENTION

The present invention relates to stable emulsion compositions. The emulsion compositions have their source from vegetable oils which are converted to thickened compositions by overbasing. The thickened compositions when combined with certain surfactants and aqueous liquids have utility in foods, pharmaceuticals and personal care products.

At present, partially hydrogenated fats are widely used in the food industry in shortening, icings, margarines, etc. However, partial hydrogenation also creates undesirable "trans" unsaturated fatty acids which have adverse effects on health.

The use of overbased materials to thicken oil and provide the consistency of a hydrogenated fat without creating any "trans" unsaturated fatty acids is described. Also, this invention can be useful in delivering antacids and other nutritional supplements in oil soluble form for pharmaceutical applications. Currently calcium, whether in antacid form or not, is supplied in a water soluble form.

BACKGROUND OF THE INVENTION

Carboxylic acids which are derived from vegetable oils are overbased to provide a gel-like composition. As the name implies, "overbasing" enables the incorporation of higher than stoichiometric amounts of basic salts such as calcium hydroxide, lithium hydroxide or magnesium hydroxide to a fatty acid.

U.S. Pat. No. 3,892,881 (Lissant, Jul. 1, 1975) relates to non-Newtonian cosmetic, nutritive and pharmaceutical preparations exemplified by stable high internal phase ratio emulsions. High internal phase ratio emulsions possess radically different properties from those of the low or medium internal phase ratio types. Specifically, they are non-Newtonian in nature exhibiting a yield value phenomenon and a decrease in the effective viscosity with share rate. In contrast to gels which require significant time periods to recover their body when subject to shear, high internal phase ratio emulsions recover to high viscosities almost instantaneously.

U.S. Pat. No. 4,229,309 (Cheng et al., Oct. 21, 1980) relates to a facile method of preparing stable, fluid magnesium—containing dispersions which comprise heating $Mg(OH)_2$ above its hydration temperature in the presence of a fluid of low volatility containing a dispersing agent soluble in said fluid.

U.S. Pat. No. 4,310,516 (Chang et al., Jan. 12, 1982) is directed to an anhydrous pseudoplastic and thixotropic oleaginous vehicle and the method by which it is prepared. More particularly, the anhydrous oleaginous vehicle is an anhydrous oleagenous material which is thickened by at least one solid emulsifying agent having an HLB not in excess of 12 and is prepared by mixing the oleaginous material and emulsifying agent at elevated temperature and then cooling the mixture over a temperature range of at least about 15° C., said range encompassing the melting or pour point of the agent.

U.S. Pat. No. 5,102,680 (Glass et al., Apr. 7, 1992) relates to a reduced fat ready-to-spread frosting composition comprising a sweetening agent; reduced levels of a defined triglyceride high solids index shortening; high levels of particular emulsifiers; about 0.1 to 1.0 wt. % of a selected high strength gelling agent; and elevated moisture levels. The shortening system is characterized by a high solid fat index. The frosting composition has a density of about 0.95–1.20 g/cc, contains less than about 6% total fat, and is further characterized in that the weight ratio of triglyceride to emulsifier is about 1:0.3–0.5.

U.S. Pat. No. 5,127,953 (Hamaguchi, Jul. 7, 1992) is directed to a fat or oil composition in powdery or granular form and a process for producing the same. More particularly, this reference is concerned with a composition comprising a fat or oil, a base material having the fat or oil included therein by occlusion or absorption and a polyol having at least two hydroxyl groups, which composition is in the form of a powder or granular having a water content, a maximum particle diameter, an average particle diameter and an angle of repose in specific ranges. The fat or oil composition of this reference has its fat or oil component well included therein by occlusion or absorption irrespective of whether the fat or oil component is liquid, semisolid or solid and has excellent handling characteristics because it has good flowability. The composition is also advantageous in that when it is contacted with water, the fat or oil is quickly separated without forming an unfavorable emulsion with water leading to benefits in use for various food products.

U.S. Pat. No. 5,132,123 (Laiho et al., Jul. 21, 1992) relates to a feed and to a process for its production. According to the process, a fatty substance is converted to the form of a metal salt of a fatty acid or fatty acids, and is combined with a carrier such as a concentrated feed. In the salt form, the salt is protected in such a way that it will not disturb the disintegration taking place in the rumen of a ruminant, but it is, nevertheless, exploitable by the digestive system of the animal. What is essential in the reference is that the metal salt is formed into a three-dimensional matrix so that substantially liquid fat or fatty acids remain in the cavities of the matrix. In a matrix form such as this, the fat is fluid and it can be transferred and batched like a liquid. It is possible to use vegetable oils which contain unsaturated fats and fatty acids for the production of a feed, whereby the fats and fatty acids can be caused, by means of the protection, to pass through the digestive system of a ruminant to the milk produced.

U.S. Pat. No. 5,158,796 (Bernhardt et al., Oct. 27, 1992) is directed to a composition of matter comprising: (a) an edible, non-absorbable, non-digestible low calorie fat material having non-Newtonian pseudoplastic properties at body temperature; and (b) an edible, absorbable, digestible food material which acts as a solvent for the fat material. The rheological properties of the fat material are defined in terms of thixotropy, yield point, thioxotropic area, and liquid/solid stability. The composition is useful as a fat substitute in low calorie food products. The composition provides a non-waxy taste in the mouth, and a laxative side effect is avoided.

U.S. Pat. No. 5,194,270 (Cante et al., Mar. 16, 1993) provides new and useful vegetable oil calcium citrate salt compositions which are readily adaptable for use in food compositions, particularly as opacifiers, whitening agents and partial fat substitutes.

U.S. Pat. No. 5,314,921 (Yesair, May 24, 1994) discloses a composition containing non-esterified fatty acids having 14–18 carbon atoms, monoglycerides which are monoesters of glycerol and fatty acids having 14–18 carbon atoms, lysophosphatidylcholine in which the fatty acid moiety has 14–18 carbon atoms and bicarbonate. The compositions can optionally also contain bile salts. These compositions form submicron size colloidal particles and can act as vehicles for transporting orally administered drugs, sources of calories in the form of readily absorbable fats and as particles for topical application to the skin. A method of making these particles is also described.

U.S. Pat. No. 5,401,424 (Vinci et al., Mar. 28, 1995) is directed to gelled overbased materials prepared by mixing an overbased composition of a metal salt of an organic acid material containing at least 8 carbon atoms, a metal salt of an organic acid material containing fewer than 6 carbon atoms, and a metal carbonate in an oleophilic medium, with an alcohol or an alcohol-water mixture, and heating the mixture.

U.S. Pat. No. 5,652,011 (Heertje et al., Jul. 29, 1997) provides a new way of structuring the aqueous phase of spreads and dressings. The formation of a mesomorphic phase can give rise to a firm texture and consistency. It has been found that if the aqueous phase of a spread or dressing contains a combination of such a mesomorphic phase and a specific amount of biopolymer this provides inter alia superior low fat products which are less grainy and/or which have a reduced tendency to lose moisture.

U.S. Pat. No. 5,661,189 (Grieveson et al., Aug. 26, 1997) is directed to an aqueous liquid cleansing and moisturizing composition comprising a surface active agent selected from anionic, nonionic, zwitterionic and cationic surface active agents and mixtures thereof; a benefit agent having a weight average particle size in the range 50 to 500 microns; and a thickening agent. The thickening agent is added to the benefit agent in amount from 1 to 50% wt., based on the benefit agent.

SUMMARY OF THE INVENTION

A stable emulsion composition is disclosed which comprises (A) a metal overbased gelled composition, prepared by forming a mixture of (i) a carbonated overbased material in an oleophilic medium, which material contains a metal salt of at least one organic acid material containing at least 8 carbon atoms, and (ii) an alcohol or an alcohol-water mixture;

(B) a surfactant; and (C) an aqueous liquid.

DETAILED DESCRIPTION OF THE INVENTION

The term "stable emulsion" refers to emulsion compositions that do not agglomerate, coagulate or precipitate.

(A) The Metal Overbased Gelled Composition

In order to fully explain this component, the general processes involved in preparing overbased materials will be discussed.

The overbased materials, which are contained in an oleophilic medium, are well known materials. Overbasing, also referred to as superbasing or hyperbasing, is a means for supplying a large quantity of basic material in a form which is soluble or dispersible in oil. Overbased products have been long used in lubricant technology to provide detergent additives.

Overbased materials are single phase, homogeneous systems characterized by a metal content in excess of that which would be present according to the stoichiometry of the metal and the particular acidic organic compound reacted with the metal. The amount of excess metal is commonly expressed in terms of metal ratio. The term "metal ratio" is the ratio of the total equivalents of the metal to the equivalents of the acidic organic compound. A neutral metal salt has a metal ratio of one. A salt having 4.5 times as much metal as present in a neutral salt will have metal excess of 3.5 equivalents, or a ratio of 4.5. The basic salts of the present invention often have a metal ratio of 1.5 to 30, preferably 2 to 15, and more preferably 5 to 12.

The overbased materials are prepared by reacting an acidic material, normally an acidic gas such as $SO_2$ or $CO_2$, and most commonly carbon dioxide, with a mixture comprising an acidic organic compound, a reaction medium normally comprising an oleophilic medium, a stoichiometric excess of a metal base, and preferably a promoter.

The oleophilic medium used for preparing and containing overbased materials will normally be an inert solvent for the acidic organic material. The oleophilic medium can be an oil or an organic material which is readily soluble or miscible with oil. Suitable oils include oils of lubricating viscosity, which are mineral oils. Organic materials include food grade paraffinic oil and non-food grade mineral spirits such as Stoddard solvent or food grade mineral spirits such as ISOPAR G available from Exxon.

The acidic organic compounds useful in making overbased compositions include carboxylic acids.

The carboxylic acids useful in making overbased salts are aliphatic carboxylic acids. These carboxylic acids include lower molecular weight carboxylic acids as well as higher molecular weight carboxylic acids (e.g. having more than 8 or more carbon atoms).

Carboxylic acids, particularly the higher carboxylic acids, are preferably soluble in the oleophilic medium. Usually, in order to provide the desired solubility, the number of carbon atoms in a carboxylic acid should be at least about 8, e.g., 8 to 40, preferably 10 to 30, and more preferably 10 to 24.

The carboxylic acids include saturated and unsaturated acids. Examples of such useful acids include dodecanoic acid, decanoic acid, tall oil acid, 10-methyl-tetradecanoic acid, 3-ethyl-hexadecanoic acid, and 8-methyl-octadecanoic acid, palmitic acid, stearic acid, myristic acid, oleic acid, linoleic acid, behenic acid, hexatriacontanoic acid, 12-hydroxystearic acid, 9-methylstearic acid, dichlorostearic acid, ricinoleic acid, lesquerellic acid, stearylbenzoic acid, eicosanyl-substituted naphthoic acid, dilauryl-decahydro-naphthalene carboxylic acid, mixtures of any of these acids, their alkali and alkaline earth metal salts, their ammonium salts, their anhydrides, and/or their esters, triglycerides, etc. A preferred group of aliphatic carboxylic acids includes the saturated and unsaturated higher fatty acids containing from about 12 to about 30 carbon atoms.

The metal compounds useful in making the basic metal salts are generally any Group I or Group II metal compounds (CAS version of the Periodic Table of the Elements). The Group I metals of the metal compound include alkali metals (sodium, potassium, lithium, etc.) as well as Group IB metals such as copper. The Group I metals are preferably sodium, potassium, and lithium, more preferably sodium or potassium, and most preferably sodium. The Group II metals of the metal base include the alkaline earth metals (magnesium, calcium, barium, etc.) as well as the Group IIB metals such as zinc or cadmium. Preferably the Group II metals are magnesium, calcium, barium, or zinc, preferably magnesium or calcium, and most preferably calcium. Generally the metal compounds are delivered as metal salts. The anionic portion of the salt can be hydroxyl, oxide, carbonate, borate, nitrate, etc.

Promoters are chemicals which are sometimes employed to facilitate the incorporation of metal into the basic metal compositions. Among the chemicals useful as promoters are water, ammonium hydroxide, organic acids of up to about 8 carbon atoms, nitric acid, hydrochloric acid, metal complexing agents such as alkyl salicylaldoxime, and alkali metal hydroxides such as lithium hydroxide, sodium hydroxide and potassium hydroxide, and mono- and polyhydric alcohols of up to about 30 carbon atoms. Examples of the alcohols include methanol, ethanol, isopropyl alcohol, butyl alcohol, isobutyl alcohol, dodecanol, behenyl alcohol, ethylene glycol, monomethylether of ethylene glycol, hexamethylene glycol, glycerol, pentaerythritol, benzyl alcohol, phenylethyl alcohol, aminoethanol, cinnamyl alcohol, allyl alcohol, and the like. Especially useful are the monohydric alcohols having up to about 10 carbon atoms and mixtures of methanol with higher monohydric alcohols. It is characteristic of promoters that they are normally employed in low quantities, normally at less than 1–2% by weight of the reaction mixture for promoters which are not later removed. Thus they do not normally constitute an appreciable portion of the acid functionality of the composition, but serve rather a role more as a catalyst for the overbasing process.

In preparing overbased materials, the organic acid material to be overbased normally is brought together in an inert oleophilic medium, with the metal base, the promoter, and the carbon dioxide (introduced by bubbling gaseous carbon dioxide into the mixture), and a chemical reaction ensues. The reaction temperature is usually about 27–159° C. (80°–300° F.), more often about 38–93° C. (100°–200° F.). The exact nature of the resulting overbased product is not known, but it can be described as a single phase homogeneous mixture of the solvent and either (1) a metal complex formed from the metal base, the carbon dioxide, and the organic acid and/or (2) an amorphous metal salt formed from the reaction of the carbon dioxide with the metal base and the organic acid. For purposes of the present invention the overbased material can be described as a mixture of a metal salt of an organic acid material with a metal carbonate.

A more complete description of the process for preparing ordinary overbased materials can be found in U.S. Pat. No. 3,766,067, McMillen.

One aspect of the present invention relates to an improved process for preparing overbased material which can be used to form the gels which are described in greater detail below. The process which is described below can be advantageously used for overbasing saturated and unsaturated carboxylic acids suitable for preparing overbased carboxylates. One aspect of the invention, therefore, relates specifically to the overbasing of carboxylic acids or their reactive equivalents, containing at least 8 carbon atoms in the acid portion, and in particular containing 12 to 24 carbon atoms in the acid portion. Examples of such carboxylic acids include the monocarboxylic acids of coconut acid, hydrogenated palmitic acid, hydrogenated castor acid, stearic acid, oleic acid, linoleic acid, 12-hydroxystearic acid, and 14-hydroxyarachidic acid; other such acids will be apparent to one skilled in the art.

The acid to be overbased can be present as the acid itself, or it can be supplied in the form of an alternative source for such acid, that is, another material which will react under the conditions of the overbasing to produce the desired overbased product, possibly by means of forming the actual acid as an intermediate in situ. Thus, for example, suitable acid sources include the acids themselves as well as esters, amides, anhydrides, and salts of the acids. A preferred acid source is the vegetable oil based on the acid, e.g., palm oil, or coconut oil. The source can likewise be an animal oil, e.g., tallow, lard or chicken fat. The carboxylic acid is a mixture of acids obtained from an animal oil triglyceride or a vegetable oil triglyceride or a genetically modified vegetable oil triglyceride of the formula

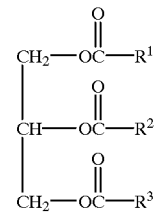

wherein $R^1$, $R^2$ and $R^3$ are independently saturated or unsaturated aliphatic hydrocarbyl groups that contain from about 7 to about 23 carbon atoms. When the triglyceride is a genetically modified triglyceride, the aliphatic groups have at least a 60 percent monounsaturated character and the oleic acid moiety:linoleic acid moiety ratio is from about 2 up to about 90.

In the alkaline environment of the overbasing reaction, the oils are believed to be saponified to form the salt, which is then overbased, although the present invention is not intended to be limited by any such theoretical explanation.

The term "hydrocarbyl group" or "hydrocarbyl substituent" as used herein denotes a radical having a carbon atom directly attached to the remainder of the molecule. The aliphatic hydrocarbyl groups include the following:

(1) Aliphatic hydrocarbon groups; that is, alkyl groups such as heptyl, octyl, nonyl, decyl, undecyl, tridecyl, pentadecyl, heptadecyl, octyl; alkenyl groups containing a single double bond such as heptenyl, nonenyl, undecenyl, tridecenyl, pentadecenyl, heptadecenyl, heneicosenyl; alkenyl groups containing 2 or 3 double bonds such as 8,11-heptadecadienyl and 8,11,14-heptadecatrienyl, and alkynyl groups containing a triple bond. All isomers of these are included, but straight chain groups are preferred.

(2) Substituted aliphatic hydrocarbon groups; that is groups containing non-hydrocarbon substituents which, in the context of this invention, do not alter the predominantly hydrocarbon character of the group. Those skilled in the art will be aware of suitable substituents; examples are hydroxy, carbalkoxy, (especially lower carbalkoxy) and alkoxy (especially lower alkoxy), the term "lower" denoting groups containing not more than 7 carbon atoms.

(3) Hetero groups; that is, groups which, while having predominantly aliphatic hydrocarbon character within the context of this invention, contain atoms other than carbon present in a chain or ring otherwise composed of aliphatic carbon atoms. Suitable hetero atoms will be apparent to those skilled in the art and include, for example, oxygen, nitrogen and sulfur.

Naturally occurring triglycerides are vegetable oil triglycerides. The preferred vegetable oil triglycerides comprise sunflower oil, corn oil, cottonseed oil, safflower oil, coconut oil, soybean oil, rapeseed oil, olive oil, canola oil, palm oil, or castor oil.

In a preferred embodiment, the natural oil is a genetically modified vegetable oil. Within this embodiment, $R^1$, $R^2$ and $R^3$ are aliphatic groups that contain from 7 to about 23 carbon atoms and have a monounsaturated character of at least 60 percent, preferably at least 70 percent and most preferably at least 80 percent. Naturally occurring triglycerides having utility in this invention are exemplified by vegetable oils that are genetically modified such that oil produced by the plants contain a higher than normal oleic acid content. Normal sunflower oil has an oleic acid content of 18–40 percent. By genetically modifying the sunflower plants, a sunflower oil can be obtained wherein the oleic content is from about 60 percent up to about 92 percent. That is, the $R^1$, $R^2$ and $R^3$ groups are heptadecenyl groups and the $R^1COO$—, $R^2COO$—, and $R^3COO$—that are attached to the

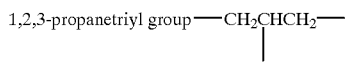

are the residue of an oleic acid molecule. U.S. Pat. Nos. 4,627,192 and 4,743,402 are herein incorporated by reference for their disclosure to the preparation of high oleic sunflower oil.

For example, a triglyceride comprised exclusively of an oleic acid moiety has an oleic acid content of 100%, and consequently a monounsaturated content of 100%. Where the triglyceride is made up of acid moieties that are 70% oleic acid, 10% stearic acid, 13% palmitic acid, and 7% linoleic acid, the monounsaturated content is 70%. The preferred triglyceride oils are high oleic (at least 60 percent) acid triglyceride oils. Typical high oleic, that is, genetically modified vegetable oils employed within the instant invention are high oleic safflower oil, high oleic corn oil, high oleic rapeseed oil, high oleic sunflower oil, high oleic canola oil, high oleic cottonseed oil, high oleic lesquerella oil, high oleic meadowfoam oil, and high oleic palm oil and high oleic soybean oil. Preferred are high oleic sunflower oil, high oleic rapeseed oil, high oleic soybean oil and high oleic safflower oil. A most preferred high oleic vegetable oil is high oleic sunflower oil obtained from Heliatnitltis sp. This product is available from The Lubrizol Corporation, Wickliffe, Ohio as LZ 7631. LZ 7631 is a high oleic triglyceride wherein the acid moieties comprise about 80 percent oleic acid. Another preferred high oleic vegetable oil is high oleic canola oil obtained from *Brassica campestris* or *Brassica napus*, also available from The Lubrizol Corporation as LZ 7633. Within this oil, the acid moieties comprise about 65–70 percent oleic acid.

It is to be noted the olive oil is excluded as a genetically modified vegetable oil in this invention. The oleic acid content of olive oil typically ranges from 65–85 percent. This content, however, is not achieved through genetic modification, but rather is naturally occurring.

It is further to be noted that genetically modified vegetable oils have high oleic acid contents at the expense of the di- and tri- unsaturated acids. A normal sunflower oil has from 20–40 percent oleic acid moieties and from 50–70 percent linoleic acid moieties. This gives a 90 percent content of mono- and di-unsaturated acid moieties (20+70) or (40+50). Genetically modifying vegetable oils generate a low di- or tri-unsaturated moiety (polyunsaturated) vegetable oil. The genetically modified oils of this invention have an oleic acid moiety:linoleic acid moiety ratio of from about 2 up to about 90. A 60 percent oleic acid moiety content and 30 percent linoleic acid moiety content of a triglyceride oil gives a ratio of 2. A triglyceride oil made up of an 80 percent oleic acid moiety and 10 percent linoleic acid moiety gives a ratio of 8. A triglyceride oil made up of a 90 percent oleic acid moiety and 1 percent linoleic acid moiety gives a ratio of 90. The ratio for normal sunflower oil is about 0.5 (30 percent oleic acid moiety and 60 percent linoleic acid moiety).

With appropriately modified genetic modification, genetically modified sunflower oil, genetically modified rapeseed oil, genetically modified soybean oil or genetically modified safflower oil can be prepared so that the aliphatic groups do not have more than 4.5 percent saturated character. Oils that have a saturated character of 4.5 percent or less are classified as zero saturate oils. Zero saturate oils have certain health benefits, one of which is that their consumption has been linked to a reduction in heart disease.

The overbasing reaction for this aspect of the present invention is accomplished using a metal base, as in ordinary overbasing reactions. Suitable metal bases include those described above, preferably calcium hydroxide or calcium oxide. Likewise a promoter or other customary chemicals can be used, as described above.

The overbasing process for saturated carboxylic acids and their equivalents is accomplished using a solvent or medium in which the acid source, the basic metal source, and any additional materials such as alcohol promoters are dissolved or suspended. The medium for the present aspect of the invention is a polar oleophilic medium. By the expression "polar oleophilic medium" is meant a material which is compatible with oil yet has sufficient polar or polarizable character to provide a measure of solubility or compatibility with the aforementioned acids or acid sources. Ordinary mineral oil or mineral spirits are sometimes not sufficiently polar to provide optimum solution or suspension of the saturated acids. On the other hand, some aromatic solvents do have a suitable degree of polarity along with a suitable boiling point to permit the use of higher carbonation temperature. In some instances commercial mixed xylene solvent, which is predominantly para-xylene, is not particularly suitable, perhaps because of the relatively low polarity, as measured by dielectric constant, of the para-xylene. The dielectric constant of para-xylene at 20° C. is reported in the "Handbook of Chemistry and Physics," 50th edition, Chemical Rubber Company, as 2.270 units. That of meta-xylene is 2.374 (20° C.), which is about the same as that of toluene, 2.239 (25° C.). The dielectric constant of ortho-xylene, however, is reported as 2.568 (at 20° C.). It appears that relatively inert aromatic materials having a dielectric constant of at least 2.4 units will be desirable for use as the medium for this aspect of the invention. A useful range is 2.4 to 10, preferably 2.5 to 6. An example of an aromatic material having a suitable degree of polarity is ortho-xylene. Using the ortho-xylene, overbased materials can be prepared from stearic, palmitic, and 12-hydroxystearic, and other saturated acids and their rective equivalents in a readily usable form. Of course, the aromatic material selected to serve as the medium should not be toxic and should not have functionality which would intellere with the overbasing reaction, i.e., the material should be inert under the conditions of the reaction. For this reason materials such as phenol would be inappropriate as solvents, since phenol is toxic and would itself react with the base employed to form a salt.

Carbonation reactions in general are well known and have been described above. A practical temperature limitation in a carbonation reaction is the boiling point at ambient pressure of a promoter material, such as isopropyl alcohol (b.p. 82° C.). The carbonation of the mixture of the present aspect of the invention is preferably conducted at a temperature within a range of 70 to 95° C., and more preferably 80 to 85° C., preferably in ortho-xylene (which has a normal boiling point of 144° C.). Overbasing by this preferred process avoids problems of solidification or formation of high viscosity material, before, during, or after the carbonation reaction. The product in ortho-xylene is generally a liquid, even at concentrations of 50% or more.

The overbased carboxylate, once prepared is then gelled, which means that the overbased carboxylate is converted to a gel. This conversion to a gel is effected by conventional gelation methods. These ordinary overbased carboxylates can be gelled, i.e., converted into a gel-like or colloidal structure, by homogenizing a "conversion agent" and the overbased carboxylate starting material. The amount of carbonated overbased material normally will comprise 1 to 70 weight percent, and preferably 10 to 50 weight percent, of the overall composition to be gelled.

The terminology "conversion agent" is intended to describe a class of very diverse materials which possess the property of being able to convert the Newtonian homogeneous, single-phase, overbased materials into non-Newtonian colloidal disperse systems. The mechanism by which conversion is accomplished is not completely understood. However, with the exception of carbon dioxide, these conversion agents generally possess active hydrogens. The conversion agents include lower aliphatic carboxylic acids, water, aliphatic alcohols, polyethoxylated materials such as polyglycols, phosphorus acids, sulfur acids, and carbon dioxide (particularly in combination with water). Mixtures of two or more of these conversion agents are also useful. Particularly useful conversion agents are alcohols having less than about twelve carbons while the lower alkanols, i.e., alkanols having less than about eight carbon atoms are preferred for reasons of economy and effectiveness in the process.

The use of a mixture of water and one or more of the alcohols is known to be especially effective for converting the overbased materials to colloidal disperse systems. Any water-alcohol combination is effective but a very effective combination is a mixture of one or more alcohols and water in a weight ratio of alcohol to water of from about 0.05:1 to about 24:1. Preferably at least one lower alkanol is present in the alcohol component of these water-alkanol mixtures. Water-alkanol mixtures wherein the alcoholic portion is one or more lower alkanols are especially suitable.

Homogenization, and thus gelation, is normally achieved by vigorous agitation of the conversion agent and the overbased starting materials, preferably at the reflux temperature or a temperature slightly below the reflux temperature, commonly 25° C. to 150° C. or slightly higher. The concentration of the conversion agent necessary to achieve conversion of the overbased material is preferably within the range of 1% to 60%, and more preferably 5 to 30%, based upon the weight of the overbased material.

Conversion of overbased materials to a colloidal disperse system is described in more detail in U.S. Pat. No. 3,492,231 (McMillen). It has been found that the techniques disclosed by McMillen and outlined above are effective for converting certain overbased materials (e.g. many of those based on hydrocaibylsulfonic acids) to gels. However, sometimes the conversion proceeds more slowly than desired, and such is often the case when the overbased material is prepared from a carboxylic acid and when the conversion agent is an alcohol or an alcohol-water mixture. Furthermore, when carboxylic acids are used it is sometimes necessary to employ higher molecular weight alcohols which are comparatively non-volatile and thus difficult to remove.

In the practice of the present invention, the carbonated overbased material in an oleophilic medium mixture (i), described above is admixed with (ii) an alcohol or alcohol-water mixture, in a weight ratio of 1:1 to 4:1, preferably about 2:1. The alcohols employed are ethyl alcohol, isopropyl alcohol or isobutyl alcohol. A preferred alcohol is isobutyl alcohol. The amount of the alcohol or alcohol water mixture (ii) is preferably about 5 to about 30 percent by weight of the overbased composition of (i). The mixture is agitated by stirring or by other means to effect good dispersion of all the components, and the mixture is heated. Heating to a temperature of 60 to 100° C. is normally sufficient to effect gelation of the mixture, normally within a period of minutes, e.g. 0.25–24 hours, typically 1–8 hours.

The gelled material obtained thereby may be used without further treatment. However, it is often desirable to remove the volatile materials, such as the volatile oleophilic medium and water and alcohol conversion agents, from the composition. At least a substantial portion of the oleophilic medium is removed. This can be effected by further heating the composition to 100–200° C. for a sufficient length of time to achieve the desired degree of removal. The heating may be conducted while utilizing nitrogen or other inert gas or under vacuum if desired, in which case the temperatures and times can be adjusted in a manner which will be apparent to the person skilled in the art.

Removal of volatile materials need not be limited to removal of the conversion agents, however. It is possible, for instance, to completely isolate the solid components of the gelled material as dry or nearly dry solids. (In this context the term "solid" or "solids" includes not only sensibly dry materials, but also materials with a high solids content which still contain a relatively small amount of residual liquid.) Isolation of solids can be effected by preparing the composition in an oleophilic medium which is a volatile organic compound. The term "volatile" as used in this context describes a material which can be removed by distillation or evaporation. Xylenes, for example, would be considered volatile organic compounds. Heating of the gel to a suitable temperature and/or subjecting it to vacuum can lead to removal of the volatile oleophilic medium to the extent desired. Typical methods of drying include bulk drying, vacuum pan drying, spray drying, flash stripping, thin film drying, vacuum double drum drying, indirect heat rotary drying, and freeze drying. Other methods of isolation of the solids can also be employed, and some of those methods do not require that the oleophilic medium be a volatile material. In one preferred embodiment, the volatile material has FDA GRAS status. Thus in addition to evaporation, such methods as dialysis, precipitation, extraction, filtration, and centrifugation can be employed to isolate the solid components of the gel.

The solid material thus isolated may be stored or transported in this form and later recombined with an appropriate amount of a medium such as an oleophilic medium (e.g. an oil). The redispersion into oil can be accomplished more readily when the solid material is not dried to absolute dryness, i.e. when a small amount of solvent remains in the composition. Alternatively an appropriate amount of an oil such as a mineral oil, a natural oil such as vegetable oil e.g. coconut oil or the like, or synthetic oil, or a surfactant, can be present in the nominally dry powder to aid in dispersion. The residual solvent, oil, or surfactant can preferably be present in amounts of 0.5 to 15 percent by weight, preferably 5 to 10 percent by weight. The solid materials, when dispersed in an appropriate medium, can provide a gel, a coating composition, a grease, another lubricant, or any of the materials which can be prepared from the originally gelled material. The solid materials can also be used without redispersion as gellants.

It is also possible to prepare a dispersion of a gel in an oil or in an oleophilic medium different from that in which the gel was originally prepared, i.e., a "replacement medium," by a solvent exchange process. Such an alternative process avoids the necessity of preparing a dried powder and redispersing it in the second, or replacement medium, and thus can eliminate one or more processing steps. The first step in one embodiment of this modified process is the preparation of a gel in a volatile polar, oleophilic medium as described in greater detail above. To this gel is admixed the oil or other material which is desired as the replacement medium. In one preferred embodiment, the volatile material has FDA GRAS status. The replacement medium comprises a vegetable oil, a genetically modified vegetable oil or white mineral oil. When this replacement medium is significantly less volatile than the original medium, the original medium (along with any other volatile components) can be removed by heating or evaporation or stripping, leaving behind the less volatile replacement medium containing the overbased gel particles. Of course, the two liquid media can be separated by other physical or chemical methods appropriate to the specific combination of materials at hand, which will be apparent to one skilled in the art.

EXAMPLES

Examples A1–A11: Preparation of Overbased Materials

Example A1

Distilled tall oil fatty acid, 1056 kg (2329 pounds), is placed in a reactor and combined with 1108 kg (2443 lb.) of 100 Neutral paraffinic oil and 190 kg (418 lb.) of calcium hydroxide. The mixture is heated with stirring to 95–100° C. and held for 1 hour. The mixture is cooled to and maintained at 50–55° C.; 103 kg (277 lb.) of a commercial isobutyl/amyl alcohol mixture and 256 kg (564 lb.) of calcium hydroxide are added. Carbon dioxide is bubbled into the mixture for 1 to 1.5 hours until a base number to phenolphthalein of 0–10 is reached. To the mixture is added 256 kg (564 lb.) of calcium hydroxide, and additional carbon dioxide is bubbled into the mixture for 1 to 1.5 hours until a base number (phenolphthalein) of 0–10 is reached. Additional 256 kg (564 lb.) of calcium hydroxide is added and the mixture similarly carbonated for 1 to 1.5 hours to a base number of 0–10. The mixture is then heated to 160° C. to remove the alcohols and water of reaction. The material is cooled to ambient temperature and centrifuged for 1 hour at 1800 rpm to remove impurities. The product obtained is an overbased calcium tallate in oil.

Example A2

Four hundred forty-nine g of purified low erucic rapeseed oil is placed in a reaction flask and combined with 692 g of SC-100, an aromatic solvent equivalent to methyl ethyl benzene, 33 g of glycerin, and 37 g. of calcium hydroxide. This mixture is heated with stirring to 140° C. and held at temperature for 4 hours. The material is cooled to 50–55° C.; 173 g of isopropyl alcohol and 92 g of calcium hydroxide are added. Carbon dioxide is bubbled into the mixture at the rate of 28 L (1.0 standard cubic feet) per hour until a base number (phenolphthalein) of 0–10 is reached. Calcium hydroxide, 92 g, is added and similarly carbonated to a final base number of 0–10. The mixture is heated to 140° C. to remove isopropyl alcohol and water of reaction. The material is cooled to ambient temperature and centrifuged for 1 hour at 1800 rpm to remove impurities and 93 g of SC-100 is added to adjust the material to 51% non-volatile materials. The resulting product is an overbased calcium rapeseed acid in SC-100.

Example A3

Charged to a 5 L 4-necked resin flask is 900 parts (3.1 equivalents) soybean oil, 1800 parts mineral spirits, and 85 parts glycerine. The flask is fitted with a stainless steel banana blade stirrer, a stainless steel subsurface gas inlet tube, a stainless steel thermowell, and a sidearm with a glass condenser. The contents are heated to 60° C. and 95 parts (2.57 equivalents) calcium hydroxide are added and the temperature is increased to reflux (about 155° C.). Reflux is maintained until the neutralization number is about 10 basic (about 2 hours). The batch is cooled to 60° C. and 90 parts isopropyl alcohol and 168 parts (4.54 equivalents) calcium hydroxide are added. Carbon dioxide is bubbled beneath the surface at 57 L (2 cubic feet) per hour to a neutralization number of between 7–12 basic. The sequence is repeated 2 more times using 98 parts isopropyl alcohol and 168 parts (4.54 equivalents) calcium hydroxide while blowing with carbon dioxide at 57 L (2 cubic feet) per hour to a neutralization number of between 7 and 12 basic, except the last increment is blown with carbon dioxide to less than 5 basic. Then 125 parts of soybean oil are added, and alcohol and water are stripped off by heating the contents to 120° C. At 50° C. the contents are clarified by dissolving in 3100 paits hexane and centrifuging the resultant solution at 1800 rpm for 1 hour. The liquid is decanted away from the solids and the liquid contents are then stripped at 130° C. at 2.7 kPa (20 mm mercury). The product obtained is an overbased calcium soyate in mineral spirits.

Example A4

To a 3 L 4-necked resin flask fitted with the equipment of Example A3 is charged 584 parts (2.0 equivalents) soybean oil, 600 parts 100 N paraffinic oil, and 65 parts glycerine. The contents are heated to 60° C. and 82.5 parts (2.2 equivalents) calcium hydroxide are added and the temperature is increased to reflux (about 155° C.). Reflux is maintained until a neutralization number is about 10 basic (about 2 hours). The batch is cooled to 60° C. and 100 parts isopropyl alcohol and 127 parts (3.4 equivalents) calcium hydroxide are added. Carbon dioxide is bubbled beneath the surface at 57 L (2 cubic feet) per hour to a neutralization number of about 7–12. The sequence is repeated 2 more times using 50 parts isopropyl alcohol and 127 parts (3.4 equivalents) calcium hydroxide while blowing with carbon dioxide at 57 L (2 cubic feet) per hour to a neutralization number of between 7–12, except the last increment is blown to less than 5. The contents are stripped of water and alcohol by heating to 70° C. while blowing with nitrogen at 28 L (1 cubic foot) per hour and later under a vacuum at 2.7 kPa (20 mm Hg). The product obtained is an overbased calcium soyate in 100 N paraffinic oil.

Example A5

Example A4 is repeated except that methyl oleate is used in place of soybean oil. The product is an overbased oleate in oil.

Example A6

Four hundred thirty-six g of purified coconut oil is placed in a reaction flask and combined with 500 g SC-100, 43 g of glycerin, and 89.5 g calcium hydroxide. The mixture is heated with stirring to 140° C. and held at temperature for 4 hours. The mixture is cooled to and maintained at 90° C., and 1000 g SC-100 and 100 g isopropyl alcohol are added. The temperature is further reduced to 50–55° C. Calcium hydroxide, 132.8 g, is added and carbon dioxide is bubbled into the mixture at the rate of 28 L (1.0 standard cubic feet) per hour for 1–1.5 hours to a phenolphthalein base number of 0–10. Another charge of 132.8 g calcium hydroxide and 100 g isopropyl alcohol is added and the mixture is carbonated at the same rate for 1–1.5 hours to the same base number. Finally, another 132.8 g calcium hydroxide and 100 g isopropyl alcohol are added and, because of high viscosity, 1000 g of SC-100 is added. The mixture is carbonated at the same rate for 1–1.5 hours to the same base number. The mixture is heated to 157° C. to remove the isopropyl alcohol and water of reaction. The material is cooled to 50° C., 1220 g of SC-100 is added and mixed in for 0.5 hours, and the material is centrifuged for 1 hour at 1800 rpm. The decantate is the product, which is an overbased calcium coconut acid in SC-100.

Example A7

Four hundred thirty-six g of purified coconut oil is placed in a reaction flask and combined with 500 g o-xylene, 43 g of glycerin, and 81.4 g calcium hydroxide. The mixture is heated with stirring to 140° C. and held at temperature for 4 hours. The mixture is cooled to and maintained at 80–82° C., and 950 g o-xylene, 150 g isopropyl alcohol, and 124.9 g calcium hydroxide are added. Carbon dioxide is bubbled into the mixture at the rate of 42 L (1.5 standard cubic feet) per hour for 1–1.5 hours to a phenolphthalein base number of 0–10. Another 124.9 g calcium hydroxide is added and carbonated at the same rate to the same base number; a final charge of 124.9 g calcium hydroxide is added and similarly carbonated. The mixture is heated to 140° C. to remove the isopropyl alcohol and water of reaction. The material is cooled to 50° C., 1000 g of hexane is added and mixed, and the mixture centrifuged for 1 hour at 1600 rpm. The decantate is stripped to 139° C. to remove the hexane, leaving 1721 g of the product. The product is an overbased calcium coconut acid in o-xylene.

Example A8

Three hundred ninety-eight g of hydrogenated palm oil is placed in a reaction flask and combined with 1200 g o-xylene, 33 g of glycerin, and 37 g calcium hydroxide. The mixture is heated with stirring to 140° C. and held at temperature for 4 hours. The mixture is cooled to and maintained at 80–82° C., and 200 g isopropyl alcohol and 111 g calcium hydroxide are added. Carbon dioxide is bubbled into the mixture at the rate of 28 L (1 standard cubic feet) per hour for 1–1.5 hours to a phenolphthalein base number of 0–10. Another 111 g calcium hydroxide is added and carbonated at the same rate to the same base number; a final charge of 111 g calcium hydroxide is added and similarly carbonated. The mixture is heated to 140° C. to remove the isopropyl alcohol and water of reaction. The material is cooled to 50° C. and centrifuged for 1 hour at 1800 rpm to remove impurities. The product is an overbased calcium hydrogenated palmate in o-xylene.

Example A9

Example A7 is repeated except that in place of coconut oil, 436 g of hydrogenated castor oil is used. The product obtained is an overbased calcium hydrogenated castor acid in o-xylene.

Example A10

A reactor is charged with 1725 grams of mineral spirits, 1254 grams (5.75 equivalents) of coconut oil, 148 grams of isobutyl alcohol, and 24 grams of water. Stirring is begun and added is 223 grams of calcium hydroxide (6.03 equivalents) and the contents are stirred and heated to 99–110°C. and held at that temperature until a base number (phenolphthalcin) of 4.7–14.1 is reached. To the mixture is added 2104 grams of mineral spirits and the temperature adjusted and maintained at 70–85° C. Carbonation is carried out in seven increments. Each increment includes 155 grams (4.19 equivalent) of calcium hydroxide and blowing of carbon dioxide into the reaction mixture. About 90 grams of carbon dioxide is used during each increment. Starting in the second increment and continuing in subsequent increments, 54 grams of isobutyl alcohol is charged with the 155 g of calcium hydroxide. The carbonation step is repeated in each increment. At the end of the seventh and final increment of carbonation, carbon dioxide is continued to be bubbled to a base number (phenolphthalein) of about 4–7. The temperature at the end of this carbonation procedure is about 70° C.

Example A11

A reactor is charged with 915 grams of SC-100, 665 grams (3.05 equivalents) of coconut oil, 146 grams of isobutyl alcohol, and 110 grams of water. The contents are stirred and 102 grams of calcium oxide (3.64 equivalents) is then added and heated to 99–110° C. and held at that temperature until a base number (phenolphthalein) of 17–27 is reached. To the mixture are added 938 grams of SC-100 solvent, 79 grams of calcium oxide (2.82 equivalents), and 61 grams of isobutyl alcohol while cooling the reaction mixture to 82° C. The balance of the calcium oxide (352 grams; 12.57 equivalents) needed for overbasing is charged to a covered, nitrogen-blanketed solids hopper which uses a screw feeder to continuously deliver the calcium oxide to the reactor. The screw feeder is started and adjusted to deliver calcium oxide to the reactor at the rate of 14 grams/hour. Carbon dioxide is simultaneously bubbled slowly into the reaction mixture at the rate of 11 grams/hour so as to maintain a base number (phenolphthalein) of approximately 65. The mixture is carbonated at 70–82° C. After about 25 hours all the carbon oxide has been charged to the reactor. Carbon dioxide is continued to be bubbled below the surface for about six more hours to a base number (phenolphthalein) of about 4–7. Two 66 gram charges of isobutyl alcohol are added to the mixture at 2 hours and at 4 hours after the end of the calcium oxide addition.

Examples A12–A28—Gelation Reactions

Example A12 (Comparative)

Into a reaction flask is placed 1181 g of the overbased material of Example A1 and combined with 1297 g of 100 N paraffinic oil, 372 g of commercial isobutyl/amyl alcohol mixture, and 124 g of water. The mixture is heated with stirring to reflux at approximately 92° C. and held for 8½ hours. The mixture is allowed to cool overnight to ambient temperature. The material is reheated to reflux; after 1 additional hour, the material is gelled as indicated by an increase in viscosity; there also appears an absorption band at 873 cm$^{-1}$ in the IR spectrum, characteristic of calcite. The mixture is held at reflux for approximately 2 hours after gelation is complete and then heated to 160° C. to remove water and isobutanol gelation solvents. The remaining material is cooled to ambient temperature. The product obtained is a tan, opaque grease-like material.

Example A13

Nine hundred grams of the overbased material of Example A1 is placed in a reaction flask and combined with 750 g paraffinic bright stock, 750 g of a 500 N paraffinic oil, 240 g of isopropyl alcohol, 60 g water, and 40 g calcium hydroxide. This mixture is heated with stirring to 50° C. over 0.5 hours, at which time a mixture of 60 g acetic acid and 60 g water is added dropwise over 0.5 hours at 50–65° C. After the addition is complete, the materials are stilled and heated to reflux at approximately 82° C. After the material is maintained at rellux for approximately 1.5 hours, the materials have gelled, as indicated by an increase in viscosity and separation of the alcohol and water from the bulk of the mixture. The materials are held at reflux with stirring for approximately 1 hour after the gelation is complete and then heated to 160° C. to remove the water and isopropyl alcohol gelation solvents. The resulting material is cooled with stirring to 80° C. or less. The product obtained is a clear brown grease-like material.

Example A14

Eleven hundred twelve grams of the overbased material of Example A2 and 333 g of 100 N paraffinic oil are placed in a reaction vessel, heated to 150° C., and vacuum stripped, 4.7 kPa (35 mm Hg), to dryness to remove the SC-100. The mixture is cooled to 50° C. and the procedure of Example A18 is repeated, except 65 g of calcium hydroxide is used. The product obtained is a clear, brown grease-like material.

Example A15

Eight hundred grams of the overbased material of Example A6, 148 g of paraffinic bright stock, and 252 g of 500 N paraffinic oil are placed in a reaction vessel, heated to 150° C., and vacuum stripped, 4.7 kPa (35 mm Hg) to dryness to remove the mineral spirits. The mixture is cooled to 50° C. and the procedure of Example A18 is repeated except that 473 g of paraffinic bright stock, 806 g of 500 N paraffinic oil, 300 g of isopropyl alcohol, 75 g of water, 37 g of calcium hydroxide, and a solution of 63 g acetic acid and 75 g of water are used. The product obtained is a clear brown grease-like material.

Example A16

Example A13 is repeated except that in place of 900 g of the material of Example A1, 841 g of the material of Example A4 and 59 g of 100 N paraffinic oil are used.

Example A17

Example A16 is repeated except that in place of the material of Example A4, the material of Example A5 is used.

Example A18

Example A13 is repeated except that in place of paraffinic bright stock and 500 N paraffinic oil, rapeseed oil is used. The amounts of materials are 1350 g of the material of Example A1, 66 g of 100 N paraffinic oil, 1416 g of rapeseed oil, 270 g of isopropyl alcohol, 70 g of water, 97.5 g of calcium hydroxide, and a solution of 90 g acetic acid and 65 g of water. After the resulting material is cooled with stirring to 80° C. or less, 896 g of rapeseed oil is added and the mixture stirred for 0.5 hour. The product obtained is a tan, translucent grease-like material.

Example A19

Example A14 is repeated except that in place of paraffinic bright stock and 500 N paraffinic oil, rapeseed oil is used.

Example A20

Example A5 is repeated except that in place of paraffinic bright stock and 500 N paraffinic oil, rapeseed oil is used. The amounts used are 600 g of the material of Example A3, 500 g of rapeseed oil (in the first addition), 415 g of rapeseed oil (in the second addition), 140 g of isopropyl alcohol, 30 g of water, 27.8 g of calcium hydroxide, and a solution of 47.6 g of acetic acid and 40 g of water.

Example A21

Example A16 is repeated except that in place of paraffinic bright stock and 500 N paraffinic oil, rapeseed oil is used.

Example A22

Example A17 is repeated except that in place of paraffinic bright stock and 500 N paraffinic oil, rapeseed oil is used.

Example A23

Six hundred grams of the overbased material of Example A3 is placed in a reaction flask and combined with 600 g mineral spirits, and thereafter treated as in Example A13 with 140 g of isopropyl alcohol, 30 g of water, 27.6 g of calcium hydroxide, and a solution of 47.6 g of acetic acid and 40 g water. After the contents have been heated to 160° C. to remove the isopropyl alcohol and water, 915 g of rapeseed oil is added and the contents are vacuum stripped to dryness at 4.7 kPa (35 mm Hg), to remove the mineral spirits. Rapeseed oil, 343 g, is added while cooling to 80° C. or less, to give a grease-like material.

Example A24

The overbased material of Example A7, 6021 g, is placed in a reaction flask and combined with 1611 g o-xylene, 763 g isopropyl alcohol, 191 g water, and 199.5 g calcium hydroxide. The mixture is heated with stirring to 50° C. over 0.5 hours, at which time a mixture of 163.5 g acetic acid and 191 g water is added dropwise over 0.5 hours at 50–65° C. After the addition is complete, the mixture is heated to reflux, approximately 82° C., and maintained at that temperature for 1.5 hours, at which time gellation is complete. The materials are maintained at reflux for approximately an additional 1 hour after gelation is complete and then heated to 140° C. to remove the water and isopropyl alcohol. Coconut oil, 309 g, is added. The material is cooled to ambient temperature to give a stiff gel with approximately 45% non-volatile materials.

Example A25

The overbased material from Example A8, 777 g, is placed in a reaction flask with 223 g of o-xylene, 100 g of isopropyl alcohol, 25 g of water, and 35.5 g of calcium hydroxide. The mixture is heated with stirring to 50° C. over 0.25 hours, at which time a mixture of 41.4 g acetic acid and 25 g of water is added dropwise over 0.15 hours at 50–60° C. After the addition is complete, the mixture is heated to reflux, 82° C., and held for 1.5 hours until gelation is complete. The materials are maintained at reflux for 1 hour after gelation is complete and then heated to 132° C. to remove water and isopropyl alcohol. Coconut oil, 43.7 g, is added. The mixture is cooled to ambient temperature to give a stiff gel with approximately 45.3% non-volatile materials.

Example A26

The overbased material from Example A9, 738 g, is placed in a reaction flask with 100 g isopropyl alcohol and 50 g water. The mixture is heated with stirring to reflux, 82° C., and held for 10 hours over 2 days at that temperature, at which time the gelation is complete. Four hundred g of o-xylene is added and the mixture is held at reflux for 1 additional hour. The mixture is then heated to 140° C. to remove the water and isopropyl alcohol. Coconut oil, 30 g, is added and the mixture is cooled to ambient temperature to give a very stiff gel with approximately 32% non-volatile materials.

Example A27

To the contents of Example A10 is charged 506 grams of isobutyl alcohol and 189 grams of water to form a mixture. The mixture is heated to 82° C. for gelation. About 1416 grams of mineral spirits are added when about 80% of total carbonate is converted from the amorphous to the crystalline form (as determined by the IR). Another 2192 grams of mineral spirits are added when 90–100% of the carbonate is converted to the crystalline form. The mixture is heated to 126° C. to remove the water and isobutyl alcohol. About 1949 grams of distillate is recovered. About 1356 grams of mineral spirits is added to adjust the level of solids to about 25% (i.e. 25% solids, 75% liquids). The contents are cooled to room temperature to obtain a grease-like material.

Example A28

To the contents of Example A11 is charged 800 grams of SC-100 solvent, 344 grams of isobutyl alcohol, and 259 grams of water to form a mixture. The mixture is heated to 88° C. for gelation. About 1300 grams of SC-100 solvent is added when about 80% of total carbonate is converted to the crystalline form (as determined by the IR). When 90–100% of the carbonate is converted from the amorphous to the crystalline form, the gelation is complete. The reaction mixture is heated to 126° C. to remove the water and isobutyl alcohol. About 800 grams of SC-100 solvent is added during this process to lower viscosity. About 2435 grams of distillate is recovered. About 1400 grams of SC-100 solvent is added to adjust the level of solids to about 25% (i.e. 25% solids, 75% liquids).

Examples A29–A36—Preparation of Powders and Greases

The following example demonstrates the solvent exchange process of substituting or exchanging one solvent for another.

Example A29

To 4730 grams of the product of Example A27 is charged 1690 grams of rapeseed oil. The mixture is heated with stirring and vacuum is applied to remove 1527 grams of mineral spirits at 70° C. Then 1528 grams of rapeseed oil are added and vacuum is applied to remove 773 grams of mineral spirits at 80–100° C. About 584 grams of rapeseed oil are added and vacuum is applied to remove 1151 grams of mineral spirits at 100–170° C. Obtained is a grease-like material that is about 25% saponified, overbased, and gelled coconut oil in rapeseed oil.

Example A30

Example A24 is repeated except that at the end of the procedure the material is transferred to a tray and vacuum dried at 4.7 kPa (35 mm Hg) at 70–80° C. to obtain a powder.

Example A31

Example A25 is repeated, except at the end of the procedure the material is transferred to a tray and vacuum dried at 47 kPa (35 mm Hg) at 70–80° C. to obtain a powder.

Example A32

Example A26 is repeated except at the end of the procedure the material is transferred to a tray an vacuum dried at 4.7 kPa (35 mm Hg) at 70–80° C. to obtain a powder.

Example A33

The powder from Example A30, 810 g, is placed in a reaction flask and combined with 2790 g of 800 N mineral oil. The mixture is heated with stirring to 175° C. under nitrogen over 3 hours, then cooled to ambient temperature. The mixture is milled twice on a 3-roll mill, and the product obtained is a grease-like material.

Example A34

Example A33 is repeated using rapeseed oil in place of 800 N paraffinic oil.

Example A35

Example A33 is repeated except that the powder from Example A40 is used.

Example A36

Example A35 is repeated using rapeseed oil in place of 800 N paraffinic oil.

Example A37

The ingredients of Example A20 are combined except that the overbased material of Example A13 is replaced by an equivalent amount of a calcium carbonate overbased mahogany sulfonate having a metal ratio of 10. The mixture is heated to with stirring until the gelation occurs, after which the composition is treated as in Example A11.

Each of the documents referred to above is incorporated herein by reference. Except in the Examples, or where otherwise explicitly indicated, all numerical quantities in this description specifying amounts of materials, number of atoms, reaction conditions, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. As used herein, the expression "consisting essentially of" permits the inclusion of substances which do not materially affect the basic and novel characteristics of the composition under consideration.

(B) The Surfactant

Surfactants act as wetting, dispersing, suspending and binding agents. Surfactants are useful as emulsifiers and in detergents and personal care products. The surfactants can be of the non-ionic, cationic, anionic, amphoteric or zwitterionic type. Non-ionic surfactants include ethylene oxide condensates in which at least one terminal group is terminated by condensation with an alcohol, alkylphenol or long chain fatty acid. The non-ionic surfactants also include esters of sorbitol, polyalkylene glycols, ester or partial ester of polyalkylene glycol, an ester or partial ester of a polyol, e.g. as glycerol monooleate, diglycerol monooleate, glycerol monostearate, polyoxy stearate, and sucrose fatty acid esters. Examples of anionic surfactants are stearyltriethanolamine and sodium lauryl sulfate. Examples of cationic surfactants are benzalkonium chloride and benzethonium chloride. Representative examples of amphoteric surfactants are the phosphoglycerides, also known as phospholipids. A particular useful phospholipid is lecithin.

Specific surfactants having utility as (B) are sorbitan esters, phospholipids and glycerol monooleates. The sorbitan esters are of the formula

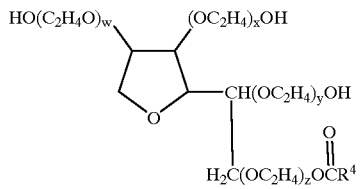

wherein $R^4$ is an aliphatic group containing from 7 up to about 23 carbon atoms and the sum of w, x, y and z is either zero or from 10–60 or, preferably, from 18–22.

Preferably $R^4$ is an alkenyl group containing from 11 up to about 23 carbon atoms and most preferably $R^4$ is a heptadecenyl group.

Surfactants within the pureview of the above structure are identified as Span® and Tween®. In the Span series, the sum of w, x, y and z is zero. Span 20 is sorbitan monolaurate, Span 40 is sorbitan monopalmitate, Span 60 is sorbitan monostearate, Span 80 is sorbitan monooleate, Span 83 is sorbitan sesquioleate and Span 85 is sorbitan trioleate. The Tween materials are derived from the Span products by adding polyoxyethylene chains to the nonesterified hydroxyls. In the Tween series, the sum of w, x, y and z is 20. Tween 20 polyoxyethylene (20) sorbitan monolaurate, Tween 40 is polyoxyethylene (20) sorbitan monopalmitate, Tween 60 is polyoxyethylene (20) sorbitan monostearate, Tween 80 is polyoxyethylene (20) sorbitan monooleate, Tween 85 is polyoxyethlene (20) sorbitan trioleate. The Span and Tween products are available from Atlas Chemical Co. Especially preferred are Span 80 and Tween 80.

The phospholipids are of the formula

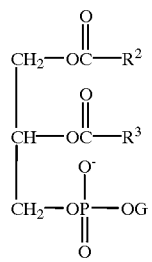

wherein $R^2$ and $R^3$ are aliphatic groups independently containing from 7 to about 23 carbon atoms, preferably from 15 to 21 carbon atoms, and G is selected from the group consisting of hydrogen,

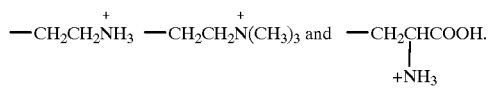

A preferred phospholipid is lecithin where G is

The partially esterfied aliphatic ester of glycerol has the formula

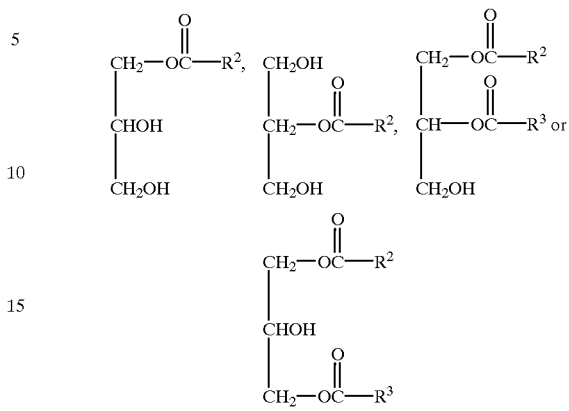

wherein $R^2$ and $R^3$ are independently aliphatic groups that contain from 7 up to about 23 carbon atoms. Aliphatic esters of glycerol are prepared by reacting 1 or 2 moles of a carboxylic acid $R^2COOH/R^3COOH$ with 1 mole of glycerol to form respectively a glycerol mono-ester or glycerol di-ester or by selective hydrolysis of a triglyceride. In a most preferred embodiment, $R^2$ and $R^3$ are a mixture of alkyl and alkenyl groups wherein the alkenyl groups are at least 60 percent with the remainder being alkyl groups. Most preferably $R^2$ and $R^3$ contain at least 75 percent alkenyl groups. Preferably, the alkenyl group is a heptadecenyl group.

(C) The Aqueous Liquid

The third essential component of this invention is an aqueous liquid. The aqueous liquid is water or water with at least one liquid that is soluble or partially soluble in water to give a solution such that the aqueous liquid comprises at least 30 percent by weight, preferably at least 50 percent by weight and, most preferably, at least 60 percent by weight of water and the remainder being liquids soluble or partially soluble in water. A non-exhaustive list of liquids that are water soluble or partially soluble and have utility in this invention are methyl alcohol, ethyl alcohol, n-propyl alcohol, isopropyl alcohol, n-butyl alcohol, isobutyl alcohol, sec-butyl alcohol, acetic acid, propionic acid, propylene glycol, 1,3-propanediol, glycerol esters of acids of $C_5$ and below, high fructose corn syrup and diethanolamine.

In addition to components (A), (B) and (C), the compositions of this invention may also include at least one of a solute, a suspended solid or an oxidation inhibitor. Both the solute and the suspended solid are solid materials. Solutes having utility in this invention are of the ionic and non-ionic types. A non-exhaustive list of these solutes is as follows: ionic: amino acids and salts; e.g., sodium chloride, potassium nitrate, sodium carbonate and sodium bicarbonate; non-ionic: sugars, e.g., glucose, fructose, mannose, ribose, galactose, maltose, lactose and sucrose.

The preferred solutes will have at least a partial solubility in the aqueous liquid (C).

The suspended solid comprises e.g., flour, bentonites, talc or silicas. The purpose of the suspended solid depends on the utility of the application, e.g., flour for cake mixes and talc and bentonites for personal care and cosmetics. The suspended solid does not immediately settle away from the emulsion composition. The settling rate depends upon the solid employed as well as the viscosity of the emulsion compositions.

The oxidative inhibitor is of the formula

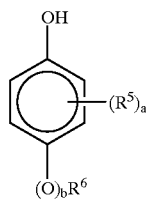

wherein $R^5$ is an alkyl group containing from 1 to 8 carbon atoms, $R^6$ is an alkyl group containing from 1 to 4 carbon atoms, a is an integer of from 1 to 4 and b is zero or one.

When b is one, the antioxidant is an ether and in the preferred ether, $R^5$ is t-butyl, a is 1 and $R^6$ is methyl, such that the preferred ether antioxidant is butylated hydroxy anisole (BHA).

When b is zero, the antioxidant is phenolic and in the preferred phenolic antioxidant, $R^5$ is t-butyl, a is 2 and $R^6$ is methyl, such that the preferred phenolic antioxidant is butylated hydroxy toluene (BHT).

When antioxidants are present in the composition of this invention, they are present at a level of not more than 0.5% by weight, preferably not more than 0.1% by weight and most preferably not more than 0.05% by weight.

The compositions of the present invention comprising components (A), (B) and (C), as well as the optional solute, suspended solids, and oxidation inhibitor are useful in foods, pharmaceticals and personal care products.

In order for the compositions of this invention to be suitable for certain uses, compliance with FDA Good Manufacturing Practice (GMP) regulations (21 CFR Part 110) is required. GMP regulations specify a means to assure a clean product which is of purity suitable for its intended use, does not transmit biological disease agents and avoids adulteration. The regulations list specific and general requirements on cleanliness and suitability of personnel, utensils and equipment, operations, grounds and facilities and measures to insure that processing controls are adequate. It is common practice for manufacturers to meet GMP with documented standard operating procedures (SOP) and check-lists and control charts to indicate compliance with the SOP on an hourly or daily basis, or on each batch as required.

The compositions of this invention, as well as the components that form the compositions may be regulated by the United States Food and Drug Administration with GRAS status. GRAS means "generally recognized as safe." Their safety is generally based on extensive toxicological test data or based on use experience for an extended period of time, but their use may be limited. It is impracticable to list all substances that are generally recognized as safe for their intended use. However, by way of illustration, such common food ingredients as salt, pepper, vinegar, baking powder and monosodium glutamate are safe for their intended use. A list of approved substances can be found in 21 CFR Parts 170 to 199, published by the Office of Federal Register National Archives and Records Administration.

When the composition comprises components (A), (B) and (C), the following states the ranges of these components in parts by weight.

| Component | Generally | Preferred | Most Preferred |
|---|---|---|---|
| A | 30–60 | 40–55 | 45–50 |
| B | 2–8 | 4–8 | 5–7 |
| C | 30–60 | 40–55 | 45–50 |

When the composition comprises components (A), (B) and (C) and a solute, the following states the ranges of these components in parts by weight.

| Component | Generally | Preferred | Most Preferred |
|---|---|---|---|
| A | 27–45 | 30–40 | 35–40 |
| B | 2–8 | 4–8 | 4–6 |
| C | 27–45 | 30–40 | 35–40 |
| Solute | 15–25 | 18–23 | 19–21 |

When the composition comprises components (A), (B) and (C) and a suspended solid, the following states the ranges of these components in parts by weight.

| Component | Generally | Preferred | Most Preferred |
|---|---|---|---|
| A | 27–45 | 30–40 | 35–40 |
| B | 2–8 | 4–8 | 4–6 |
| C | 27–45 | 30–40 | 35–40 |
| Suspended Solid | 15–25 | 18–23 | 19–21 |

It is understood that other components besides (A), (B), (C), solute and suspended solids may be present within the composition of this invention.

The components of this invention are mixed together according to the above ranges to effect emulsion. The following outlines examples so as to provide those of ordinary skill in the art with a complete disclosure and description on how to make the emulsion compositions of this invention and it is not intended to limit the scope of what the inventors regard as the invention.

Example 1

Added to a quart bottle are 200 g of the product of Example A29 and 25 g Span 80. The contents are mixed using a twin propeller blade variable speed mixer until the contents are homogeneous. The bottle is rotated by hand to assist mixing. Over a 5 minute period, 200 g water is slowly added while mixing vigorously until homogeneous to give a cake icing-like product.

Example 2

The procedure of Example 1 is repeated except after the water addition, 100 g confectioners powdered sugar is added over 5 minutes until homogeneous to give a cake icing-like product.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A stable emulsion composition, comprising;

(A) a metal overbased gelled composition, prepared by forming a mixture of (i) a carbonated overbased material in an oleophilic medium, which material contains a metal salt of at least one organic acid material containing at least 8 carbon atoms, and (ii) an alcohol or an alcohol-water mixture;

(B) a surfactant; and (C) an aqueous liquid.

2. The composition of claim 1 wherein the carbonated overbased material is prepared by reacting a mixture of at least one organic acid material containing at least 8 carbon atoms or a reactive equivalent thereof with a stoichiometric excess of a metal salt and carbonating the mixture.

3. The composition of claim 1 wherein the oleophilic medium is an oil.

4. The composition of claim 3 wherein the oil is a food grade paraffinic oil or a food grade mineral spirits.

5. The composition of claim 4 wherein the oil is a food grade paraffinic oil.

6. The composition of claim 1 wherein the oleophilic medium is a volatile non-food grade organic solvent.

7. The composition of claim 6 wherein the volatile non-food grade organic solvent is toluene, xylene or Stoddard solvent.

8. The composition of claim 1 wherein the metal of the metal salt of the organic acid material is an alkali metal or an alkaline earth metal.

9. The composition of claim 1 wherein the metal is an alkali metal comprising lithium, sodium or potassium.

10. The composition of claim 1 wherein the metal is an alkaline earth metal comprising magnesium, calcium or barium.

11. The composition of claim 1 wherein the metal is calcium.

12. The composition of claim 1 wherein the organic acid material containing at least 8 carbon atoms is a carboxylic acid.

13. The composition of claim 12 wherein the carboxylic acid contains from 10 to 24 carbon atoms.

14. The composition of claim 12 wherein the carboxylic acid is a monocarboxylic acid.

15. The composition of claim 12 wherein the carboxylic acid is a mixture of acids obtained from an animal oil triglyceride or a vegetable oil triglyceride of the formula

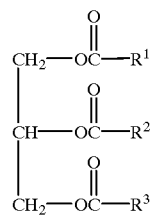

wherein $R^1$, $R^2$ and $R^3$ are independently saturated or unsaturated aliphatic hydrocarbyl groups that contain from about 7 to about 23 carbon atoms.

16. The composition of claim 12 wherein the carboxylic acid is a mixture of acids from a genetically modified vegetable oil triglyceride of the formula

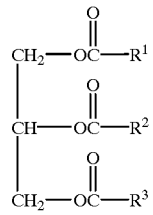

wherein $R^1$, $R^2$ and $R^3$ are independently saturated or unsaturated aliphatic hydrocarbyl groups that contain from about 7 to about 23 carbon atoms and have at least a 60 percent monounsaturated character and the oleic acid moiety:linoleic acid moiety ratio is from about 2 up to about 90.

17. The composition of claim 15 wherein the vegetable oils are sunflower oil, rapeseed oil, canola oil, corn oil, cottonseed oil, safflower oil, olive oil, castor oil, soybean oil, palm oil or coconut oil.

18. The composition of claim 16 wherein the genetically modified vegetable oils are genetically modified safflower oil, genetically modified corn oil, genetically modified rapeseed oil, genetically modified sunflower, genetically modified soybean oil, genetically modified cottonseed oil, genetically modified lesquerella oil, genetically modified meadowfoam oil and genetically modified palm oil.

19. The composition of claim 18 wherein the genetically modified vegetable oils are genetically modified sunflower oil, genetically modified rapeseed oil, genetically modified soybean oil, or genetically modified safflower oil.

20. The composition of claim 16 wherein the genetically modified oil has a monounsaturated character of at least 70 percent.

21. The composition of claim 16 wherein the genetically modified oil has a monounsaturated character of at least 80 percent.

22. The composition of claim 12 wherein the carboxylic acid is coconut acid, palmitic acid, castor acid, stearic acid, 12-hydroxystearic acid, oleic acid, or 14-hydroxyarachidic acid.

23. The composition of claim 1 wherein the carbonated overbased material has a metal ratio of from 1.5 to 30.

24. The composition of claim 21 wherein the metal ratio is from 2 to 15.

25. The composition of claim 1 wherein the alcohol is ethyl alcohol, isopropyl alcohol or isobutyl alcohol.

26. The composition of claim 1 wherein the alcohol of the alcohol water mixture is isobutyl alcohol.

27. The composition of claim 1 wherein the amount of the alcohol or alcohol water mixture of (ii) is about 5 to 30 percent by weight of the composition of (i).

28. The composition of claim 1 wherein the mixture of (i) and (ii) is heated to about 60 to 100° C.

29. The composition of claim 1 further comprising the step of heating the mixture to about 100 to 200° C. while blowing with nitrogen or under vacuum after heating from 60 to 100° C. to remove volatiles from the mixture.

30. The composition of claim 1 further comprising the step of removing at least a substantial portion of the oleophilic medium and isolating a resulting solid.

31. The composition of claim 30 wherein the oleophilic medium is a volatile organic solvent which is removed by distillation or evaporation.

32. The composition of claim 1 further comprising admixing the metal overbased gelled composition with a replacement medium and removing the oleophilic medium wherein the replacement medium is a vegetable oil, a genetically modified vegetable or white mineral oil.

33. The composition of claim 1 wherein within (B) the surfactant comprises anionic surfactants, cationic surfactants or non-ionic surfactants.

34. The composition of claim 33 wherein the non-ionic surfactant is an ester or partial ester of a polyol.

35. The composition of claim 1 wherein within (B) the surfactant comprises sorbitan ester of the formula

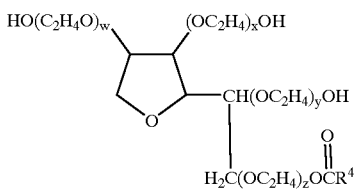

wherein $R^4$ is an aliphatic group containing from 7 up to about 23 carbon atoms and the sum of w, x, y and z is either zero or from 10–60, a phospholipid of the formula

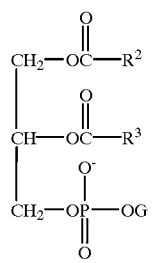

wherein $R^2$ and $R^3$ are aliphatic groups independently containing from 7 to about 23 carbon atoms and G is selected from the group consisting of hydrogen,

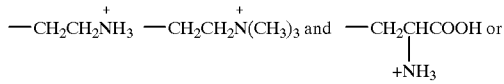

a glycerol monooleate.

36. The composition of claim 35 wherein $R^4$ is an alkenyl group containing from about 11 up to about 23 carbon atoms.

37. The composition of claim 36 wherein $R^4$ is a heptadecenyl group.

38. The composition of claim 35 wherein G is

39. The composition of claim 37 wherein the sum of w, x, y and z is zero.

40. The composition of claim 37 wherein the sum of w, x, y and z is 18–22.

41. The composition of claim 35 wherein the wherein $R^2$ and $R^3$ contain from 15 to 21 carbon atoms.

42. The composition of claim 1 wherein (C) the aqueous liquid is water or water with at least one liquid soluble or partially soluble in water.

43. The composition of claim 1 wherein (C) the aqueous liquid is at least 30 percent water.

44. The composition of claim 1 wherein (C) the aqueous liquid is at least 50 percent water.

45. The composition of claim 42 wherein the at least one soluble or partially soluble liquid comprises methyl alcohol, ethyl alcohol, n-propyl alcohol, isopropyl alcohol, n-butyl alcohol, isobutyl alcohol, sec-butyl alcohol, acetic acid, propionic acid, propylene glycol, 1,3-propanediol, glycerol esters of acids containing not more than 5 carbon atoms, high fructose corn syrup or diethanolamine.

46. The composition of claim 1 further comprising at least one of a solute, suspended solid or an oxidation inhibitor.

47. The composition of claim 46 wherein the solute comprises ionic or non-ionic compositions.

48. The composition of claim 47 wherein the ionic solute is an amino acid or a salt comprising sodium chloride, sodium bicarbonate, sodium carbonate or potassium nitrate.

49. The composition of claim 47 wherein the non-ionic solute is a sugar comprising glucose, fructose, mannose, ribose, galactose, maltose or lactose.

50. The composition of claim 46 wherein the suspended solid comprises flour, bentonites or silicas.

51. The composition of claim 46 wherein the oxidation inhibitor is butylated hydroxy anisole or butylated hydroxy toluene.

52. A concentrate according to claim 1 which comprises at least 20 percent by weight of a vegetable oil or genetically modified vegetable oil.

* * * * *